United States Patent
Brown

(10) Patent No.: US 12,551,521 B2
(45) Date of Patent: Feb. 17, 2026

(54) COMPOSITIONS INCLUDING PINE BARK EXTRACT, BERRYFRUIT EXTRACT AND A SOURCE OF L-THEANINE AND USES THEREOF

(71) Applicant: AREPA IP LIMITED, Auckland (NZ)

(72) Inventor: Angus Ross Brown, Auckland (NZ)

(73) Assignee: AREPA IP LIMITED, Auckland (NZ)

( * ) Notice: Subject to any disclaimer, the term of this patent is extended or adjusted under 35 U.S.C. 154(b) by 698 days.

(21) Appl. No.: 16/763,854

(22) PCT Filed: Nov. 13, 2018

(86) PCT No.: PCT/NZ2018/050159
§ 371 (c)(1),
(2) Date: May 13, 2020

(87) PCT Pub. No.: WO2019/098858
PCT Pub. Date: May 23, 2019

(65) Prior Publication Data
US 2020/0376061 A1 Dec. 3, 2020

(30) Foreign Application Priority Data
Nov. 16, 2017 (NZ) .................................... 737415

(51) Int. Cl.
| | |
|---|---|
| *A61K 36/45* | (2006.01) |
| *A23L 33/105* | (2016.01) |
| *A23L 33/175* | (2016.01) |
| *A61K 31/198* | (2006.01) |
| *A61K 36/15* | (2006.01) |
| *A61K 36/73* | (2006.01) |
| *A61P 25/22* | (2006.01) |
| *A61P 25/24* | (2006.01) |

(52) U.S. Cl.
CPC ............ *A61K 36/45* (2013.01); *A23L 33/105* (2016.08); *A23L 33/175* (2016.08); *A61K 31/198* (2013.01); *A61K 36/15* (2013.01); *A61K 36/73* (2013.01); *A61P 25/22* (2018.01); *A61P 25/24* (2018.01)

(58) Field of Classification Search
CPC .................. A61K 36/45; A61K 36/15
See application file for complete search history.

(56) References Cited

U.S. PATENT DOCUMENTS

| | | | |
|---|---|---|---|
| 2004/0171624 A1 | 9/2004 | Ozeki et al. | |
| 2016/0303176 A1 | 10/2016 | Bailey | |
| 2016/0303177 A1 | 10/2016 | Bailey | |
| 2019/0117606 A1* | 4/2019 | Scholey | ................ A23L 33/175 |

FOREIGN PATENT DOCUMENTS

| | | |
|---|---|---|
| CN | 104432063 A | 3/2015 |
| CN | 107136506 A | 9/2017 |
| JP | 200614730 A | 1/2006 |
| JP | 2009234919 A | 10/2009 |
| WO | 2007131106 A2 | 11/2007 |
| WO | 2013028333 A1 | 2/2013 |
| WO | 2017200391 A1 | 11/2017 |

OTHER PUBLICATIONS

Karhanová M, Eliášová M, Kuběna T, Pešková H, Mlčák P, Fryšák Z, Marešová K, Zapletalová J. ProVens® v léčbě glaukomu a oční hypertenze [ProVens® in the Therapy of Glaucoma and Ocular Hypertension]. Cesk Slov Oftalmol. 2015 Winter;71(6):288-92. (Year: 2015).*
Liu, Health benefits of fruit and vegetables are from additive and synergistic combinations of phytochemicals, 2003, Am J Clin Nur, 78: 517S-20S.*
Rushmore Superfoods, "Tropical Citrus POG Dietary Supplement", Record ID 3882655, [retrieved from internet Dec. 23, 2020], , Published Mar. 2016 according to Mintel GNPD [1] Category: X Claims: 1, 3-6 and 8-11.
Maximum Human Performance, "Blue Slushy Flavored Dietary Supplement", Record ID: 4455059, [retrieved from internet Jan. 4, 2021], , Published Feb. 2017 according to Mintel GNPD [1] Category: X Claims: 1, 3-6 and 8-11.
NZ 732032—A2 Specification; May 17, 2017; Alphagen NZ Limited (unpublished version of the referenced application).
Thakur, M. et al., 'Good mood foods: a panacea of life', Indian Food Industry. 2012, vol. 31, No. 2, pp. 45-52 (see 'Theanine', 'Blueberries', 'Tea', 'Industrial applications').
Ma, C. et al., 'Content and Color Stability of Anthocyanins Isolated from Schisandra chinensis Fruit', International Journal of Molecular Sciences. 2012, vol. 13, pp. 14294-14310 (See Abstract, Introduction).

(Continued)

*Primary Examiner* — Terry A McKelvey
*Assistant Examiner* — Catheryne Chen
(74) *Attorney, Agent, or Firm* — Optima Law Group, APC; Thomas E. Jurgensen

(57) ABSTRACT

The present invention relates to a functional composition and uses thereof, and in particular towards a composition that maintains or improves mental clarity. The composition includes a combination of at least two of: a pine bark extract containing proanthocyanidin(s); a berryfruit extract containing anthocyanin(s); and a source of L-theanine. The invention also relates to methods of use and treatment of said composition.

5 Claims, 8 Drawing Sheets

(56) References Cited

OTHER PUBLICATIONS

McGregor, AREPA is a New Juice Designed To Improve Mental Clarity, [retrieved from internet Oct. 14, 2020], https://www.Isnglobal.com/news/article/21292/arepa-is-a-new-juice-designed-to-improve-mental-clarity, Published May 16, 2017.
The Synergy Company Eye Protector, [retrieved from internet Oct. 14, 2020], https://web.archive.org/web/20170617080443/https://www.thesynergycompany.com/eye-protector, Published Mar. 14, 2016.
PHion Berry Superfruit, [retrieved from internet Oct. 14, 2020], https://web.archive.org/web/20160520003820/http://www.calciumsupreme.com/phion-berry-superfruit, Published May 20, 2016.
ENZO Relax & Focus, [retrieved from internet Oct. 14, 2020], https://web.archive.org/web/20160122142711/http://www.enzo.co.nz/shop/All+Products/ENZO+Relax+%26+Focus.html, Published Jan. 22, 2016.
How to Boost Mental Function with New Zealand Pine Bark, https://www.lifevantage.com/blog/how-to-boost-mental-function-with-new-zealand-pine-bark/, Published Jan. 13, 2015.
New Nordic Clear Brain Supplements, [retrieved from internet Oct. 14, 2020], http://www.newnordic.co.uk/all-products/clear-braintm, Published Jun. 22, 2016.
Rejuveniix, https://web.archive.org/web/20120601100027/https://ariix.com/pdf/mx/Rejuveniix.pdf, Published Jun. 1, 2012.
AlphaGen Arepa caffeine free antioxidant drink, (Record ID: 4672979), [retrieved from internet Jan. 15, 2019], https://www.gnpd.com/sinatra/recordpage/4672979/from_search/duubwaFS8B/?page=1, Published Mar. 2017 according to Mintel GNPD.
Good Superfoods Caffeine and Kilos Coffee & Chocolate Natural Energy Bar, (Record ID: 4593037), [retrieved from internet on Jan. 15, 2019], https://www.gnpd.com/sinatra/recordpage/4593037/from_search/iS2X887738/?page=1, Published Feb. 2017 according to Mintel GNPD.
Machine translation of CN 104432063, Published Mar. 25, 2015.
Machine translation of CN 107136506, Published Sep. 8, 2017.
Machine translation of JP 2006-014730, Published Jan. 19, 2006.
Machine translation of JP 2009-234919, Published Oct. 15, 2009.
Rushmore Superfoods, "Tropical Citrus POG Dietary Supplement", Record ID 3882655, [retrieved from internet Dec. 23, 2020], Published Mar. 2016 according to Mintel GNPD.
Maximum Human Performance, "Blue Slushy Flavored Dietary Supplement", Record ID: 4455059, [retrieved from internet Jan. 4, 2021], Published Feb. 2017 according to Mintel GNPD.
Mintel GNPD (mintel.com), Record ID 3744567, "Premium Instant Coffee Mix with Apple Extract", New Concept Product, Feb. 2016.
Mintel GNPD (mintel.com), Record ID 1737695, "Woman Tablets", Nativa, Mar. 2012.
Mintel GNPD (mintel.com), Record ID 4731261, "Pine Bark Extract + Bilberry Drink", New Organics, Apr. 2017.
Mintel GNPD (mintel.com), Record ID 4672979, "Caffeine Free Antioxidant Drink", AlphaGen, Mar. 2017.
International Journal of Molecular Sciences, vol. 13, No. 12, 2012, Chunhui Ma et al., "Content and Color Stability of Anthocyanins Isolated from Schisandra chinensis Fruit", p. 14294-14310; Available from https://www.mdpi.com/1422-0067/13/11/14294. Published Nov. 5, 2012.
Mintel GNPD (mintel.com), Record ID 1463971, "Pink Mixed Berry and White Grape Juice", Osotspa, Jan. 2011.
Mintel GNPD (mintel.com), Record ID 1103867, "Elastic Multi-Berry and Astaxanthine Tablets", Biobancker International, Jun. 2009.
Mintel GNPD (mintel.com), Record ID 4388163, "Superfruit Infusion Energy Refreshed Drink", Neurobrands, Nov. 2016.
Mintel GNPD (mintel.com), Record ID 4388165, "White Raspberry Flavored Carbonated Lifestyle Beverage", Neurobrands, Nov. 2016.
Mintel GNPD (mintel.com), Record ID 3855767, "Alcohol Free Beverage", Tranquini, Mar. 2016.

\* cited by examiner (NB: A, B and C all at baseline)

COMPOSITIONS INCLUDING PINE BARK EXTRACT, BERRYFRUIT EXTRACT AND A SOURCE OF L-THEANINE AND USES THEREOF

CROSS-REFERENCE TO RELATED APPLICATIONS

This is a U.S. national application filed under 35 U.S.C. 371 which is based on international application no. PCT/NZ2018/050159 filed Nov. 13, 2018, which claims priority to NZ application no. 737415 filed Nov. 16, 2017 and are incorporated herein by reference.

TECHNICAL FIELD

The present invention relates to a functional composition and uses thereof, and in particular towards a composition that maintains or improves mental clarity.

BACKGROUND ART

There is a growing need for humans to maintain or improve optimal mental clarity (as a component of a larger subset of attributes of overall cognitive performance), and/or deal with stress, in order to meet the demands of the ever-changing expectations of society. For example, there is increased social pressure and an expectation to deliver more efficiencies in the work environment, home environment, in the education system, and so forth.

In the context of the present invention, mental clarity should be considered the absence or suppression of distracting thoughts and feelings (i.e. internal distractions potentially caused by nervousness or uncertainty), the suppression of distracting or irrelevant sensory input (i.e. external distractions), together with reasonable level of vigour. This is compared to improved attention or cognitive performance, with the differentiation that a person may be attentive or have an improved level of "cognitive performance" but also be highly nervous or uncertain. Thus a person can be still very attentive but may not have mental clarity. Mental clarity is sought after because it allows people to remain calm and unstressed, but still be able to make rational decisions, remain concentrated and determined at a job at hand.

There is a huge and growing consumer demand for any medicament, functional food, herbal extract or supplement that helps individuals to achieve a high level of mental performance, but these can not necessarily achieve mental clarity. For example, many products include the likes of caffeine, which can often lead to a sense of jitteriness or nervousness, despite leading an apparent increase in cognitive function.

For example, Bayer markets a range of Berocca® products to support mental alertness.

Many foods or food supplements are also now heavily marketed towards improving or maintaining cognitive function, including various nuts, fruits and vegetables, fish oils, just to name a few. However, the downside with many of these foods is that they only provide a desirable effect after a sustained period of consumption, for example weeks or months, normally together with an overall healthy diet and lifestyle. Furthermore, it is often inconvenience or unpleasant to consume some food products in their unprocessed state. Supplements like fish oil capsules help to remedy this, but again such supplements are not seen by the public as having a desirable sensory perception profile.

The energy drink sector has enjoyed huge growth over recent years, based on health claims and marketing towards improving cognitive performance for a period of time after consuming the beverage, which also must taste good for commercial success. Most of these energy drinks rely on high levels of caffeine, and/or often have many unhealthy, or potentially harmful, ingredients in order to enhance the desired stimulatory effect or provide a beneficial taste. Furthermore, caffeine based energy drinks arguably may improve alertness to some extent, but as a side effect they can lead to a sense of hyper-activity, a loss of calmness, increased feeling of stress, a racing heart or a general uncomfortable jittery feeling, similar to the effects of having too much coffee. Furthermore, consuming too many of these energy drinks, either in a short time frame, or over an extended period, is a potential health concern.

Overall, there is a need to develop new functional foods/beverages that maintain or improve mental clarity without the need for caffeine, and to do so while also providing an associated calmness and lack of nervousness, rather than hyper-activity. Likewise, there is a need to provide consumers functional foods/beverages that provide immediate effects on mental clarity soon after consumption, have a desirable taste and mouthfeel, offer convenience, and are generally healthy to consume.

Besides caffeine, there are a wide number of compounds and natural extracts that are thought to have some form of link to cognitive performance and/or mood/stress. For example, lemonbalm, Passionflower, Valerian, Sage, Guarana, Chamomile, Ashwagandha, Brahmi, roseroot, skullcap, iranin borage, gotu kola, ginkgo and milk thistle are believed to provide some promising attributes or felt cognitive effects.

Yet, it is unclear how such active ingredients or extracts might be able to work together to achieve desirable effects towards mental clarity.

To better understand and perhaps harness the potential effects associated with these ingredients, there has been significant research into a number of these chemical compounds or extracts as alternatives to caffeine.

However, success has been hampered either by a lack of Western based scientific assessment or human trials which are costly and time consuming, contradictory results between studies, poor flavour or stability profiles, and/or high cost of the active ingredients/manufacturing. Furthermore, some compounds or extracts may only provide no, or only a very slight, improvement, and therefore can often be viewed as not worth pursuing commercially.

It is also very difficult to predict or test results of altering the concentration/dosage of active ingredients to provide a desirable therapeutic effect. Also, research suggests that the associated effects of most compounds/extracts on cognitive performance, with mental clarity being only one aspect, appear to work through a variety of different complex modes of action, so it is very difficult to predict how different compounds may potentially work together if combined in attempt to provide a desired effect on improved mental clarity, if any.

Alternatively, the active agents may unintentionally negate one another, or provide unwanted results. Furthermore, combining different compounds together in attempt to provide synergies also can lead to potential unwanted side effects, issues with incompatibility/instability, or can negatively affect the sensory perception profile of a given composition. In summary, there is a significant hurdle of being able to study the effects of these different components, and it is impractical to test, and essentially impossible to predict, the health effects of different combinations of active agents.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to a first aspect of the present invention there is provided a composition including a combination of at least two of:
  a) a pine bark extract containing proanthocyanidin(s);
  b) a berryfruit extract containing anthocyanin(s); and
  c) a source of L-theanine.

According to a further embodiment of the present invention there is provided a composition including:
  d) a pine bark extract containing proanthocyanidin(s); and
  e) a berryfruit extract containing anthocyanin(s).

According to a further embodiment of the present invention there is provided a composition including:
  f) a pine bark extract containing proanthocyanidin(s);
  g) a berryfruit extract containing anthocyanin(s); and
  h) a source of L-theanine.

According to a further embodiment of the present invention there is provided a composition including:
  i) a pine bark extract containing proanthocyanidin(s); and
  j) a source of L-theanine.

According to a further embodiment of the present invention there is provided a composition including:
  k) a berryfruit extract containing anthocyanin(s); and
  l) a source of L-theanine.

According to a further embodiment of the present invention there is provided a composition as described herein wherein the composition does not include an added source of catechin (other than what might be present at small levels inherently in the above components).

According to a further aspect of the present invention there is provided a use of a composition as herein described for the manufacture of a medicament for temporarily maintaining or improving mental clarity in a healthy individual.

According to a further aspect of the present invention there is a method of temporarily supporting or improving mental clarity by administering to a person in need thereof with an effective amount of a composition as described herein.

According to a further aspect of the present invention there is a composition as described herein for the use in providing a temporary improvement or maintenance of mental clarity after consumption.

According to a further aspect of the present invention there is provided a method of manufacturing a composition as herein described wherein the method includes the steps of combining at least two of the following together: pine bark extract containing proanthocyanidin(s), and a berryfruit extract containing anthocyanin(s); and a source of L-theanine.

BRIEF SUMMARY OF THE INVENTION AND ITS ADVANTAGES

We conducted a 3 day preliminary trial in human subjects according to the well established Profile of Moods States (POMS), as discussed in more depth in the results section. POMS is a standard validated psychological test which measures 65 different words or statements that subjects rate during the testing.

We demonstrated that the compositions according to the present invention surprisingly led to an overall improvement in mental clarity after consumption compared to baseline measurements, including at least one or more of the following:
  a reduction in tension (POMS test words: Tense, Shaky, On Edge, Panicky, Relaxed, Uneasy, Restless, Nervous and Anxious);
  a reduction in depressive thoughts (POMS test words: Unhappy, Sorry for Things Done, Sad, Blue, Hopeless, Unworthy, Discouraged, Lonely, Miserable, Gloomy, Desperate, Helpless, Worthless, Terrified and Guilty);
  a reduction in anger (POMS test words: Anger, Peeved, Grouchy, Spiteful, Annoyed, Resentful, Bitter, Ready to Fight, Rebellious, Deceived, Furious and Bad Tempered);
  a reduction in fatigue (POMS test words: Worn Out, Listless, Fatigued, Exhausted, Sluggish, Weary and Bushed);
  a reduction in confusion (POMS test words: Confused, Unable to Concentrate, Muddled, Bewildered, Efficient, Forgetful, and Uncertain About Things);
  an increase in vigour (POMS test words: Lively, Active, Energetic, Cheerful, Alert, Full of Pep, Carefree and Vigorous); and/or
  an overall reduction in Total Mood Disturbance (TMD, a is result of the combined features of tension, depression, anger, fatigue, confusion and vigour).

As background, in previous work we initiated in 2014, we began research and development of a beverage product designed to provide advantageous cognitive outcomes. Before embarking on that initial formulation development, we commissioned a detailed investigation from a leading international researcher specialised in the neurocognitive effects of natural products, supplements and food components. His report strongly reiterated that any specific cognitive effects of any combinations of bioactives or extracts would be practically impossible to predict in advance based on literature available individual components primarily because of the complexity surrounding different active agents and their potential biochemical effects/pathways in the body. Secondly, most of the ingredients had little to no reliable clinical data available, and this was plagued often by contradictory evidence even at the level of individual bioactives, let alone when combined with other components. His advice was that a human clinical trial would ultimately be necessary to have any insight into what effects might arise when combining ingredients together in a formulation.

After considerable formulation work applying input from our commissioned investigation, whilst also addressing issues such as sensory, shelf-stability regulatory issues and cost of goods, and we finally developed a test composition using considerable guesswork around its specific combination and its dosages that would provide some cognitive outcomes. The composition included catechin(s) (i.e. epigallocatechin gallate, epigallocatechin, epicatechin gallate, or epicatechin) from a green tea extract, L-theanine, and proanthocyanins most preferably from a pine bark extract. In order to assess the effects on cognitive function, we conducted a double blind crossover trial using this test composition which included the POMS analysis as referred to previously. We demonstrated temporary, yet a significant, felt and measured improvement of mental clarity in human subjects after consumption of the test composition. This result resonated with our expert's commissioned advice because our initial objective was actually to develop a product with an improved cognitive performance outcomes (such as learning, decision making and memory), but in fact there was no significant changes in these cognitive performance characteristics. Instead, we observed an unexpected and significant improvement in mental clarity, as defined further below.

Based on this initial crossover trial, we considered L-theanine, a catechin extract, pine bark extract containing proanthocyanidins to be essential components to achieving the mental clarity effects we observed. The formulation work and the results of our initial work were encompassed within an earlier filed patent application, New Zealand Patent Application No. 720245, the contents of which should be understood to be incorporated herein through reference.

Given the commercial importance of mental clarity, we developed this composition into a drink product which also included blackcurrant extract, and this has had considerable commercial success since its launch in August 2016. Our study data has also now been supported by further anecdotal feedback from consumers about the significant felt effects towards mental clarity using these combined components.

However, since our initial work, we have continued our R&D because we recognised there was an opportunity to improve even further on our initial innovation, either in terms of improved mental clarity outcomes (or similar), or formulation changes which can be just as commercially important (such as cost savings on material, sensory outcomes, shelf-stability and alternative composition formats).

Over the past 3 years, we have continued experimenting with many variables including other extracts and actives but with no substantial success. Ultimately we decided to hone our efforts into assessing different combinations and ratios/dosages of the four ingredients previously used in our commercialised composition to see whether the mental clarity effects were still observed or improved upon. Given that we knew that predicting outcomes when the components are altered was essentially impossible, we used the POMS testing process to assess the effectiveness of different combinations of the active agents/extracts. This led to further unexpected breakthroughs, as summarised below, and discussed further throughout.

Our results showed at least five key outcomes, without limitation:
  a) surprisingly, we could achieve similar or improved mental clarity effects as to our initial cross-over trial by using a combination of two or three ingredients, importantly each trial without catechins which we previously considered as a critical component to achieving the desired effects, and generally speaking, a component that is well associated with different aspects of cognitive function;
  b) berryfruit extract contribute strongly to the mental clarity outcomes, and it appears has a significant synergy at least with the pine bark extract. We had no prior knowledge of this from our previous study, and there has been no published work on this that we are aware of.
  c) when using dual combinations, we identified there was a "sweet spot" range in terms of dosage and/or ratio of each of the two/three components in order to achieve the described effects. These dosages and/or rations were different to what was initially used in our product composition and as previously trialled and such outcomes would have been very difficult to predict;
  d) advantageously, the results were importantly observed in a different format to a drink, namely pills/tablets;
  e) anecdotally, we observed no negative outcomes, for instance no reduction of cognitive function.

Commercially speaking, these were significant results for numerous reasons. First, it opens up significant opportunity to develop new compositions to achieve different mental clarity outcomes. Second, purified catechin such as 98% EGCG is a very expensive ingredient and in our previous composition was used at quite a high dosage given the expected importance of it. Therefore, a composition that is not dependent on catechin to achieve mental clarity effects was seen as a considerable breakthrough. Third, catechins may have an effect on sensory results due to its bitterness, so a composition that is not hindered by the necessary inclusion of catechins such as EGCG was also seen as being a commercially valuable breakthrough.

The advantages of the invention will be discussed throughout the remainder of the specification.

DEFINITIONS AND PREFERRED EMBODIMENTS

Throughout the specification, the term mental clarity (or improvement thereof) should be understood to mean a favourable disturbance of any one or more features, or combined scoring, within the POMS characteristics (namely within the tension, depression, anger, fatigue, confusion, vigour domains; and/or overall total mood disturbance (TMD). For instance, the "tension" domain includes measures such as nervousness and anxiety, and the "confusion" domain includes measures such as uncertainty and bewilderment, all of which are considered aspects of mental clarity, either in isolation, or when considered together as a whole (as preferred). It should be understood that mental clarity is a specific subset of overall mental performance, the latter which includes other factors such as composite memory, verbal memory, visual memory, processing speed, executive function, psychomotor speed, reaction time, complex attention, cognitive flexibility domains and overall neurocognitive index. Therefore, the immediate therapeutic use and advantages of the present invention is focused towards improvements in temporary mental clarity in generally healthy individuals, not overall cognitive performance (such as enhanced memory), nor is it intended to address an underlying therapeutic disease or disorder.

Composition Type

The composition may be formulated in a range of different ways. For example, the composition may be formulated as a liquid or semi-liquid beverage, or as a food supplement such as a pill, capsule or powder. Alternatively, the composition may be formulated into a food item, such as a chocolate bar, or other similar snack. Those skilled in the art would understand typical processes and methods used to prepare food items using the compositions according to the present invention.

Most preferably, the composition is formulated as a solid dosage form, such as a pill or capsule.

It should be understood that the compositions may also include other components such as micro or macro nutrients, vitamins, minerals, bioactives, extracts or other fortificants without departing from the scope of the invention.

Pine Bark Extract Including Proanthocyanidin

There has been no clinical studies reporting effects of pine bark extract on mood or mental clarity, either alone or in combination with other bioactives/extracts. There is only limited data on the effects of pine bark extract towards different aspects of cognitive function, such as memory and psychomotor performance—however, these are very different to achieving mental clarity as per the present invention.

The compositions containing pine bark extract provided advantageous results, when in combination individually with L-theanine, berryfruit extract, or both. When pine bark extract is not present (for example as shown in test composition C), the same mental clarity effects are not as beneficial as discussed in further depth in the Best Modes section. Additionally, we saw that combinations of pine bark extract with a berryfruit extract (with or without L-theanine) showed the most beneficial results compared to a composition which includes the pine bark extract combined just with L-theanine. Without wishing to be bound by theory, this suggested to us that, within the body after consumption, some or all of the bioactives within the pine bark extract may have a particularly synergistically beneficial effects with component(s) within the blackcurrant extract.

Preferably, the pine bark extract is a *Pinus radiata* pine bark extract.

However, as an alternative, one may use *Pinus pinaster*, or Maritime pine bark (found predominantly in the Mediterranean region) most likely with similar results.

Commercially available pine bark extracts are Enzogenol® and Pycnogenol® which contain proanthocyanidins together with other condensed flavonoids. For instance, Enzogenol® has about 80% (by weight) proanthocyanidins.

Preferably, the composition includes a dosage of above 150 mg, and more preferably above 300 mg of proanthocyanidin or pine bark extract per dosage.

More preferably, the composition includes a dosage between about 300 to 900 mg proanthocyanidin or pine bark extract per dosage and even more preferably at a dosage of between 400-700 mg.

Most preferably the composition includes about 500 mg proanthocyanidin or pine bark extract per dosage.

These preferred levels of pine bark extract is contrary to a typical dosage of pine bark extract used for different therapeutic applications. Normally, the dosage of pine bark extract is in the order of 50-300 mg, and hence this was reflected in the considerably lower dosage of 150 mg used in our initial composition compared to the present invention. In preliminary results (not shown), lower doses of pine bark extract did not show the same mental clarity effects when combined with L-theanine and/or berryfruit extract.

It should be realised that the concentration (w/v or w/w) will likely depend on the format of the composition, for instance whether it is a pill, food, or beverage. In a pill, the concentration can be much higher in order to achieve a smaller total dosage volume/size and given that sensory effects are not as noticeable as within a beverage.

Berryfruit Extract Containing Anthocyanins

There is a small amount of published evidence to suggest that the flavonoids and anthocyanins within berryfruit extract may impart a delayed onset of cognitive decline due to aging. However, studies have been largely limited to animal trials, and there has been no published clinical trials on the effects of berryfruit extracts explicitly on mental clarity, or with combinations with other extracts/bioactives.

Anthocyanins are members of the flavonoid group of phytochemicals often present in berryfruit (amongst other foods), and are most often responsible for imparting a deep red/purple/blue pigment to the fruit. Without limitation, we suggest that the likely active constituents are the anthocyanins; however it is unclear how these or other bioactives within the extracts may be working synergistically with the other components in the composition described herein.

In the present invention, compositions that contain berryfruit extracts show a substantial improvement in numerous mental clarity attributes. In particular, a surprising effect was that the berryfruit extract within the composition helps to counter fatigue issues which were seen in test composition A (L-theanine and pine bark extract). This was not observed in composition D.

Preferably, the composition includes a dosage between about 300 mg to 1000 mg berryfruit extract per dosage, or more preferably about 400-700 mg per dosage, most preferably about 500 mg. The POMS results of the compositions containing berryfruit extract (as exemplified in test compositions B, C and D) are seen as very beneficial especially when in combination with the pine bark at a dosage of above 150 mg, and particularly above 300 mg (see results for test compositions B and D).

Preferably, the berryfruit (or extract thereof) is selected from the group consisting of blackcurrant, blueberry, boysenberry and combinations thereof.

Most preferably, the berryfruit (or extract thereof) is blackcurrant extract.

Blackcurrant, blueberry and boysenberry all contain high levels of anthocyanins (albeit different types), although blackcurrant is seen to be the most attractive as it has particularly levels and types of anthocyanins linked to therapeutic outcomes.

L-Theanine

Throughout the specification, the term L-theanine should be understood to mean γ-glutamylethylamide, or a suitable source of L-theanine, such as a green tea extract (*Camellia sinensis*, or other species of *Camellia*) or the edible mushroom *Xerocomus badius*. Notably, the invention does not cover D-theanine. Synthetically derived L-theanine may also be used, or even L-theanine derivatives thereof, if shown to also provide the same functionality as described herein.

L-theanine is water soluble, known to cross the blood-brain barrier, and reaches peak concentrations about one hour after consumption. There is some scientific literature to support that L-theanine can have a relaxant effect, but this can also lead to an undesirable drowsiness effect. There is also some evidence that L-theanine can have an unwanted effect on increased anxiety. Additionally, L-theanine can have some negative effects on other aspects of cognitive performance, especially if combined with other psychoactive agents. For instance, studies show that L-theanine and caffeine (also in green tea) interact, illustrating how difficult it can be to predict outcomes in compositions containing multiple bioactives, or wherein different extracts/ratios/amounts are used together.

The inventors found that when L-theanine was combined with pine bark extract, many advantageous results from the POMS testing were observed. However, the inventors consider that the most preferred results were seen when L-theanine was combined with both pine bark extract and berryfruit, because the fatigue effects which appear to be caused by L-theanine in combination with pine bark are somehow nullified. Interestingly, scores for the depression domain were also improved when L-theanine, pine bark extract and berryfruit extract were provided in combination (see test composition D), whereas this was not observed in test composition A.

Preferably, the composition includes a dosage of least 50 mg L-theanine.

Previous studies suggest that effects of L-theanine are observed at as little as 50 mg dosage; however the Applicant expects the beneficial effects will be seen with a dosage between about 50 to 500 mg L-theanine.

More preferably, the composition includes a dosage of between about 100-300 mg L-theanine.

Most preferably, the composition includes about 200 mg L-theanine.

As described further below in the best modes section, these dosage amounts/concentration of L-theanine appeared to show the most promising results when in combination with the other components of the composition.

Preferably, the composition includes at least two of the following components a) to c):
a) a dosage above 150 mg pine bark extract (or proanthocyanidin therein), more preferably between 300-900 mg, even more preferably between 400-700 mg, and most preferably about 500 mg;
b) a dosage between 300 to 1000 mg, more preferably 400-700 mg and most preferably about 500 mg berryfruit extract and;
c) a dosage between 50-500 mg L-theanine, more preferably between 100-300 mg and most preferably about 200 mg L-theanine.

Preferably the composition includes a ratio of any two or more one of the components a) to c) above that falls within the dosages described.

Most preferably (and as applicable depending on the composition used), the composition includes a ratio of between:
a) 1:3 to 3:1 (w/w) of pine bark extract to the berryfruit extract; more preferably 1:2 to 2:1, and most preferably about 1:1; and/or
b) 0.5:5 to 4:5 (w/w) of L-theanine to either pine bark extract and/or berryfruit extract, more preferably 1:5 to 3:5, and most preferably about 2:5.

Preferably, the composition is caffeine free.

A significant advantage of the composition is that it does not rely on any need for a caffeine to provide the beneficial mental clarity effects, and avoids the jitteriness or anxiety associated with caffeine. It also avoids unwanted interactions between caffeine and the key bioactives in the composition, for example as shown in the literature with L-theanine and caffeine.

Preferably, the composition includes no added sugar.

Uses/Treatments

Preferably, the composition is used to treat, prevent, maintain or improve mental clarity.

More preferably, mental clarity is selected from any one or combination of the following attributes (or as herein further described with reference to the results of the present application):

a) a reduction in tension (or any one or more of the attributes contributing to this domain);
b) a reduction in depressive thoughts (or any one or more of the attributes contributing to this domain);
c) a reduction in anger (or any one or more of the attributes contributing to this domain);
d) a reduction in fatigue (or any one or more of the attributes contributing to this domain);
e) a reduction in confusion (or any one or more of the attributes contributing to this domain);
f) an increase in vigour (or any one or more of the attributes contributing to this domain); and/or
g) an overall reduction in total mood disturbance (TMD, a is result of the combined features of tension, depression, anger, fatigue, confusion and vigour).

Preferably, the effect of improved mental clarity is temporary.

Most preferably, the effect of improved mental clarity is provided for a period of about 1-5 hours after consumption.

Preliminary tests (not shown) have indicated that the composition provides a significantly improved mental clarity for a period of about 4-5 hours after consumption.

Additionally, our results show that the effects can be largely sustained over time as illustrated with the testing completed at 3 days after ongoing consumption. In many cases, the mental clarity effects are even more pronounced at the 3 day mark compared to the results observed directly after consumption. These are very important effects, given it illustrates there are no negative outcomes on mental clarity either short or medium term when consuming the product. Often extended periods of mental clarity are necessary to achieve a desired outcome, such as writing an important report or carrying out a project over a few days to a week. It can be expected that the trend may well continue beyond the 3 day mark if the product is continued to be taken at the dosages provided.

Alternatively the composition is used to treat, prevent, maintain or improve a healthy person's level of stress, mood, or sense of calmness.

Preferably, the dosages as described herein are administered or consumed by a consumer or patient between 1 to 3 times per day. A dosage may be provided in multiple delivery units, for instance one dosage may be 2 capsules, administered once a day.

Summary of Some of the Advantages of the Present Invention beneficial mental clarity effects can be observed with all the compositions as illustrated by the POMS questionnaire;

Total Mood Disturbances (TMD) reduced with all of the compositions within one hour of consumption, and reduced even further after a total of three doses over three days. This indicates an immediate beneficial effect on mood, and a long term benefit that may be cumulative;

the data suggests that pine bark extract and berryfruit extract in particular work synergistically to improve mental clarity/mood;

achieving strong mental clarity results without the need for catechins, which are expensive and add complications to the formulation;

we can achieve the mental clarity results with combinations of just two components;

the composition is caffeine free;

the composition is shown to be effective in dosage forms such as pills or capsules. It would be expected that the same effects could be observed in other formats, such as if the composition is applied into food or beverages.

BEST MODES FOR CARRYING OUT THE INVENTION

Brief Description of the Drawings

Further aspects of the present invention will become apparent from the ensuing description which is given by way of example only and with reference to the accompanying drawings in which.

Figure 1:
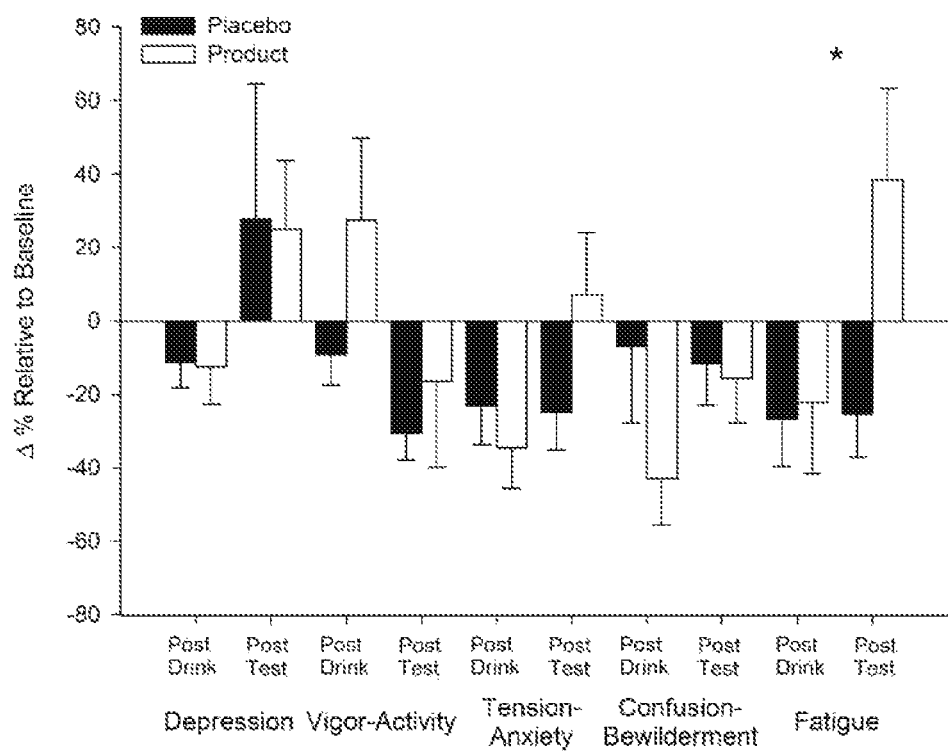
FIG. 1. Results from previous cross-over trial containing 150 mg pine bark extract, 300 mg EGCG and 200 mg L-theanine vs placebo FIG. 2. POMS results showing Tension Domain (Dosing Groups A-D)
Figure 2:
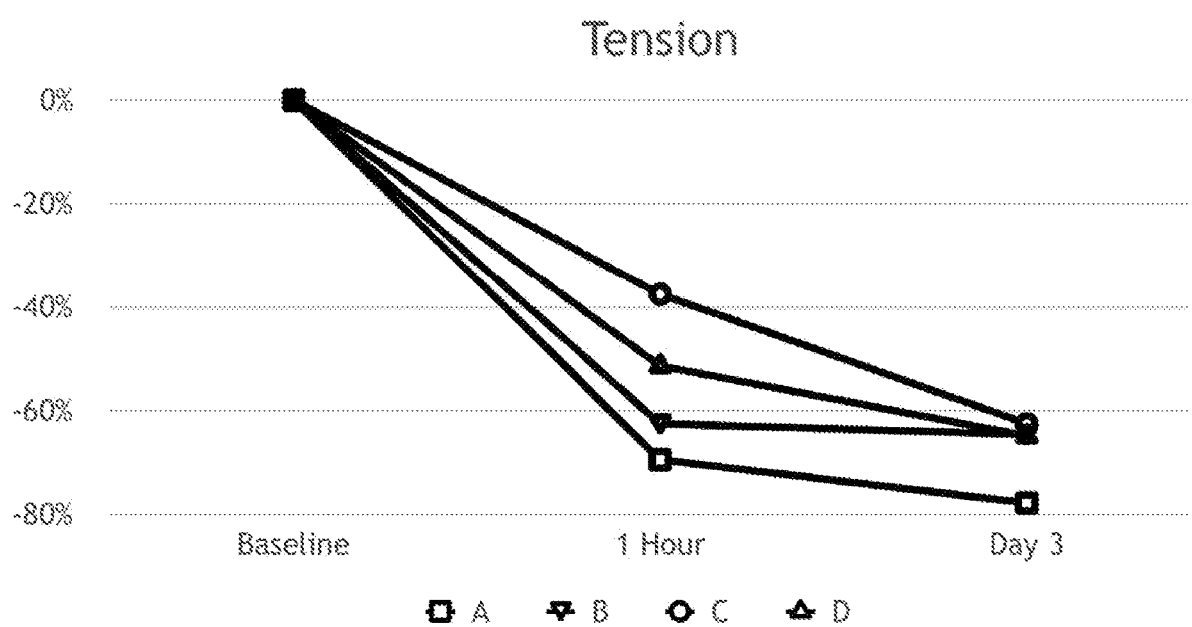
Figure 3:
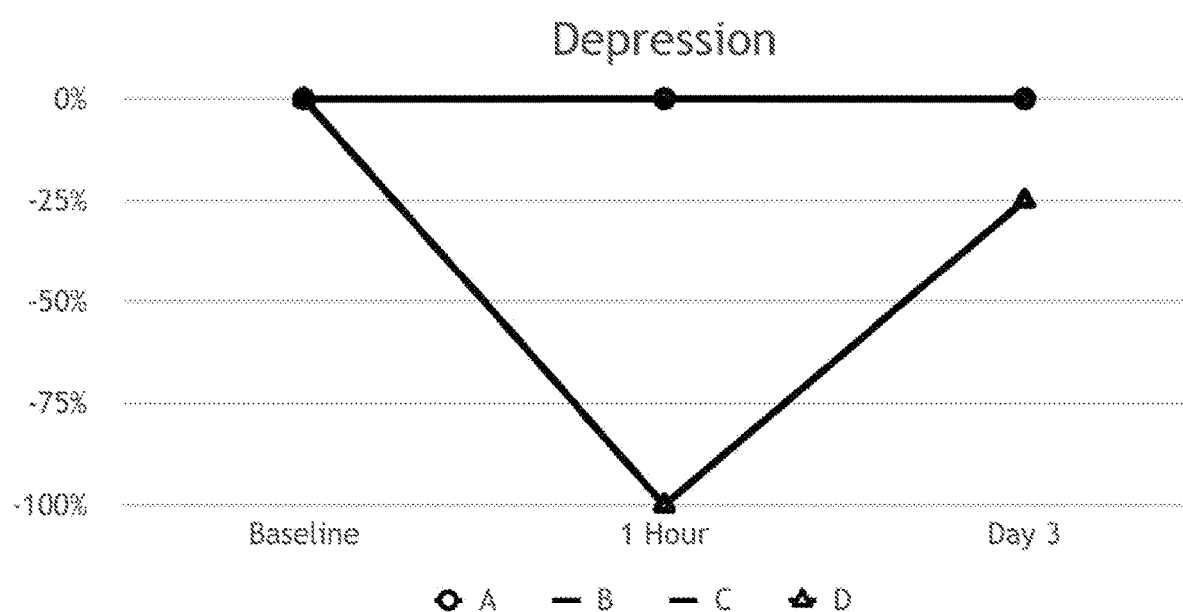
FIG. 3. POMS results showing Depression Domain (Dosing Groups A-D)
Figure 4:
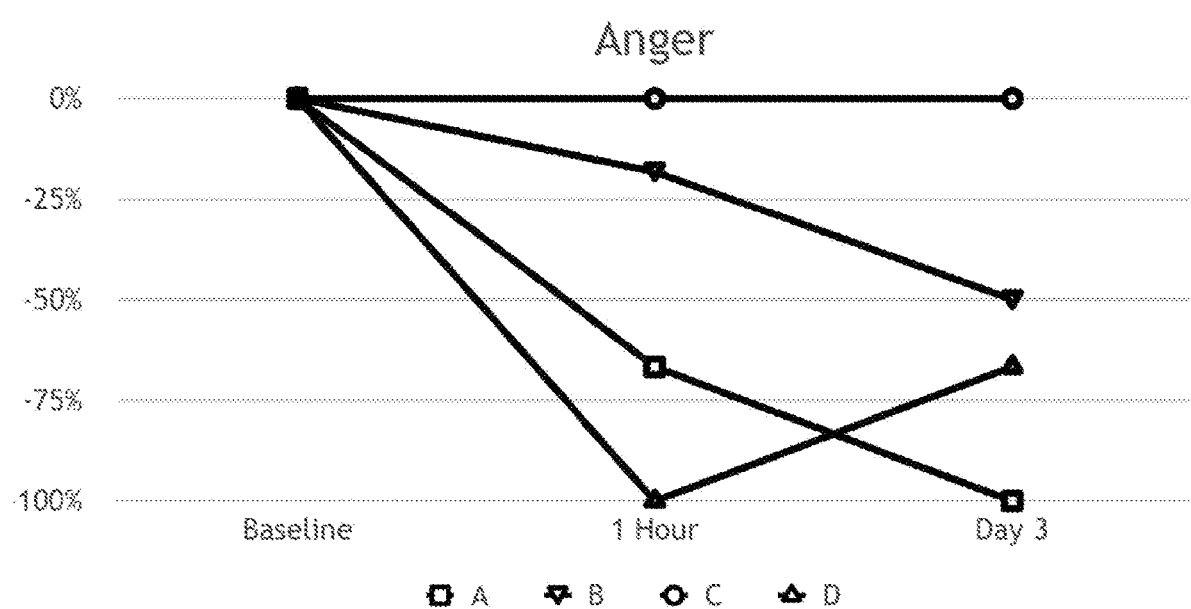
FIG. 4. POMS results showing Anger Domain (Dosing Groups A-D)
Figure 5:
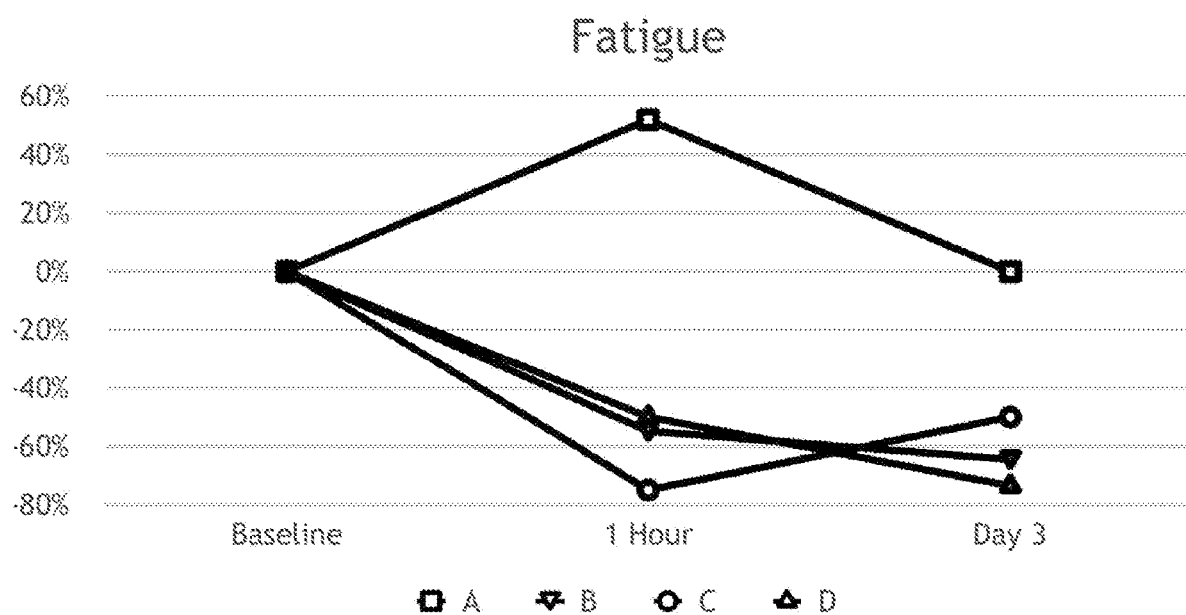
FIG. 5. POMS results showing Fatigue Domain (Dosing Groups A-D)
Figure 6:
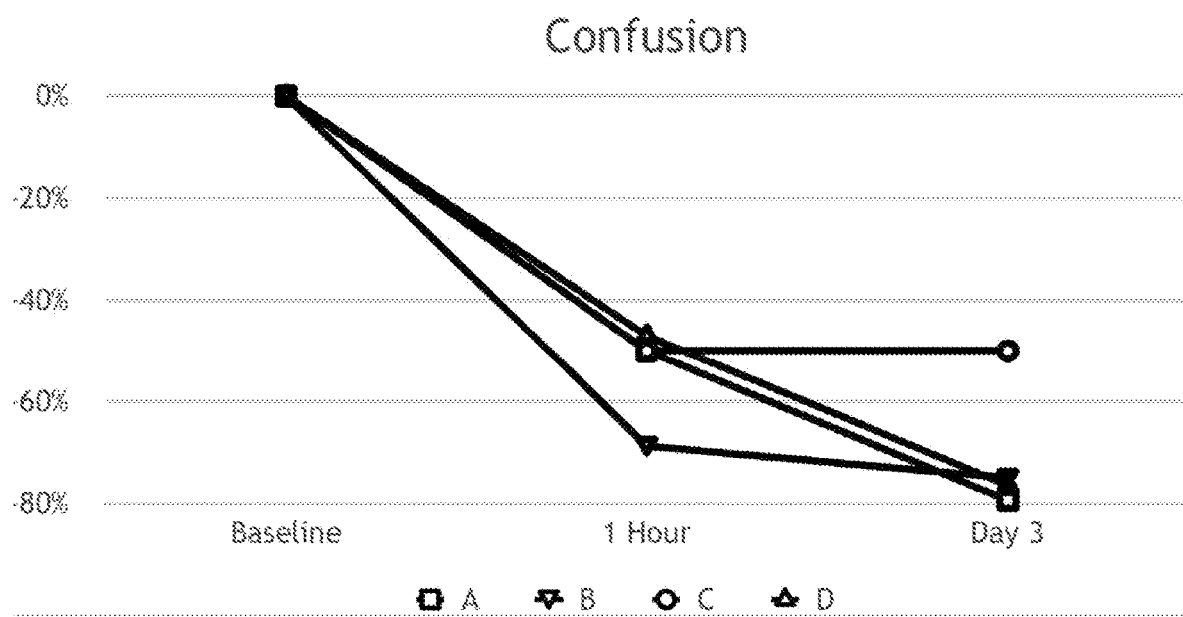
FIG. 6. POMS results showing Confusion Domain (Dosing Groups A-D)
Figure 7:
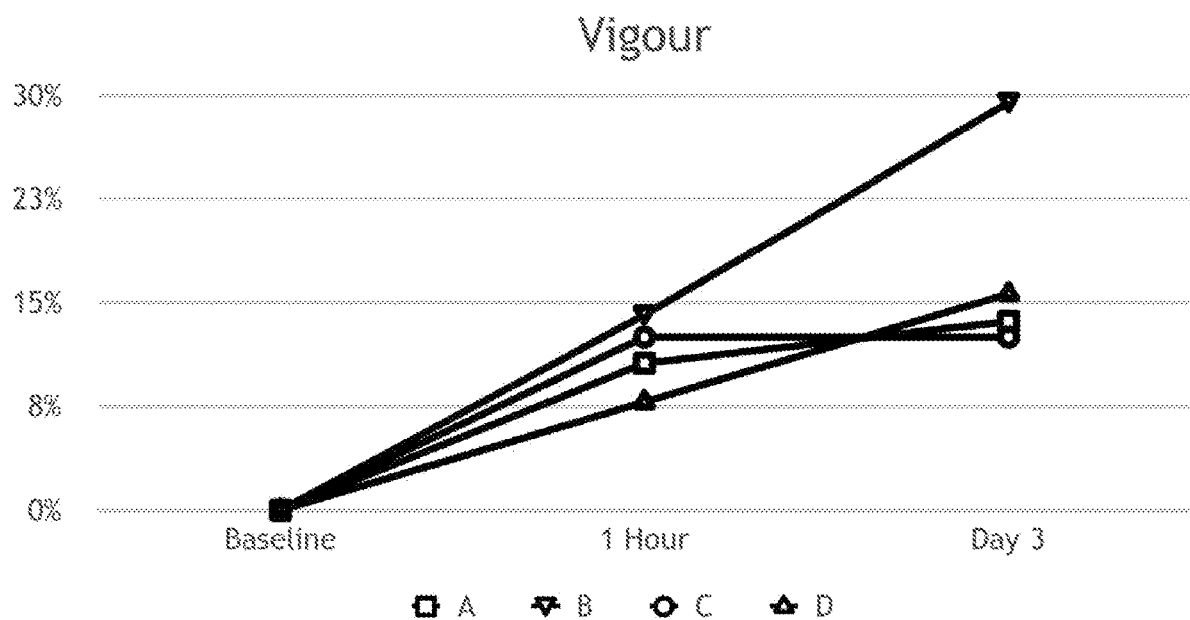
FIG. 7. POMS results showing Vigour Domain (Dosing Groups A-D)
Figure 8:
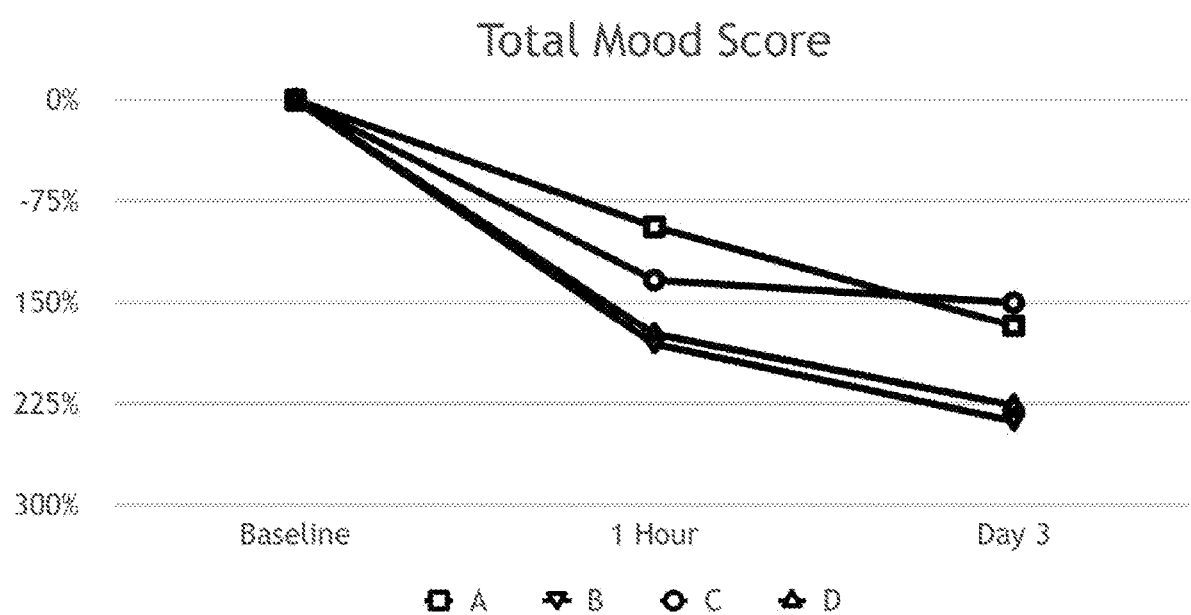
FIG. 8. POMS results showing overall Total Mood Disruption (TMD) (Dosing Groups A-D)

Example 1: Methodology of Profile of Moods State (POMS) Testing

POMS is a standardised validated psychological test. It is a questionnaire contains 65 words/phrases that describe mood or feelings. Each adjective is rated from 0-4 in terms of how the participant feels in the present moment; 0—not at all, 1—a little, 2—moderately, 3—quite a bit, and 4—extremely. NB: the words relaxed (in Tension domain) and efficient (in Confusion domain) are marked in the reverse order. Each word falls under one of six domains; Tension, Depression, Anger, Fatigue, Confusion, and Vigour.

The scores given to the words that fall within each domain are then combined for an overall score for each domain, and then further with the other Domain scores to provide the Total Mood Disturbance (TMD). It is calculated by combining the scores or Tension, Depression, Anger, Fatigue and Confusion, and subtracting the score for the Vigour domain.

The words/phrases that form part of the questionnaire are shown below:

Tension domain (POMS test words: Tense, Shaky, On Edge, Panicky, Relaxed, Uneasy, Restless, Nervous and Anxious);

Depression domain (POMS test words: Unhappy, Sorry for Things Done, Sad, Blue, Hopeless, Unworthy, Discouraged, Lonely, Miserable, Gloomy, Desperate, Helpless, Worthless, Terrified and Guilty);

Anger domain (POMS test words: Anger, Peeved, Grouchy, Spiteful, Annoyed, Resentful, Bitter, Ready to Fight, Rebellious, Deceived, Furious and Bad Tempered);

Fatigue domain (POMS test words: Worn Out, Listless, Fatigued, Exhausted, Sluggish, Weary and Bushed);

Confusion domain (POMS test words: Confused, Unable to Concentrate, Muddled, Bewildered, Efficient, Forgetful, and Uncertain About Things);

Vigour domain (POMS test words: Lively, Active, Energetic, Cheerful, Alert, Full of Pep, Carefree and Vigorous); and/or an overall reduction in total mood disturbance (TMD, a is result of the combined features of tension, depression, anger, fatigue, confusion and vigour).

To provide context to the baseline (Pre-consumption at day 1), we show the results as a baseline of 0%, and the results from Day 1 (post drink) and Day 3 (post drink) are shown as positive or negative change from the baseline of 0%.

We organised the trial into four groups (Dosage Groups A, B, C and D), with each group containing five human subjects (all were healthy adults under 50 years old). The groups were advised they would be provided with samples of a single formulation which included an undisclosed combination of ingredients selected from L-theanine, pine bark extract a New Zealand blackcurrant extract. The subjects were told to not consume any caffeine or alcohol for 24 hour prior to, and during, the study.

The subjects were instructed to fill in the POMS questionnaire at three timepoints, namely:

on Day 1 of the trial prior to consumption of the test dosage, on Day 1 at 1 hour following consumption of the test dosage (2 capsules), and on Day 3 at 1 hour following consumption of the test dosage (2 capsules).

The subjects were instructed to consume the 2 capsules on an empty stomach.

Additionally, at day two, subjects were instructed to also consume 2 capsules on an empty stomach, but not asked to conduct the questionnaire at this timepoint.

Example 2: Test Compositions A-D

Each subject was given a dosage as shown below, the total dosage being provided within 2 capsules/day.

| Component | Dosage Group A | Dosage Group B | Dosage Group C | Dosage Group D |
|---|---|---|---|---|
| New Zealand blackcurrant extract | Nil | 500 mg | 500 mg | 500 mg |
| Pine bark extract, Pinus Radiata (Enzogenol ®) | 500 mg | 500 mg | Nil | 500 mg |
| L-theanine | 200 mg | Nil | 200 mg | 200 mg |

Example 3: Results of the POMS Testing

Previous Cross-Over Trial—POMS Testing

The results from our previous study are shown in FIG. 1. The dosage from the previous trials provided 150 mg of pine bark extract, 320 mg of green tea extracts (providing 98% EGCG) and 200 mg L-theanine. The "Post Drink" results which were 30 minutes after consuming a product on a single day (not the Post Test results) may be used as a useful reference to the current invention but it should be considered with caution. This is considering the trial was conducted under slightly different conditions and with a different research group, and finally using different subjects who followed a different protocol involving a cognitive battery test as a subsequent test. Therefore the "Post Test" results should be ignored in FIG. 1. Additionally, unlike the present POMS testing protocol, the Anger domain was not assessed in the previous clinical trial and the previous testing was only conducted for 1 day, not over three days as per the present trial.

Regardless, it is interesting to note that the Post Drink results (30 minutes post drink) from the previous crossover trial showed consistently advantageous mental clarity results across the Depression (—17%), Vigour (+25%), Tension (—37%), Confusion (—42%) and Fatigue (—22%) domains when averaged across the different subjects. As previously discussed, although these were great results, we felt there was still an opportunity to improve on these on all or certain aspects of mental clarity, or on the formulation itself whilst still achieving a similar result.

Dosage Group A Results

Table 1 below shows the average scores for each domain from the five test subjects, both in terms of real values, as well as relative to baseline at 0% shown in brackets (pre-drink values on day 1). The comparative results are also seen in FIGS. 2-8.

TABLE 1

Results from Dosage Group A

| Domain | Pre-test, Day 1 Real value (relative to Baseline) | Post-dose, Day 1 Real value (relative to Baseline) | Post-dose, Day 3 Real value (relative to Baseline) |
| --- | --- | --- | --- |
| Tension | 7.2 (0%) | 2.2 (−69%) | 1.6 (−78%) |
| Depression | 0.6 (0%) | 0.4 (0%) | 0 (0%) |
| Anger | 3 (0%) | 1 (−67%) | 0 (−100%) |
| Fatigue | 5.4 (0%) | 8.2 (+52%) | 5.4 (0%) |
| Confusion | 6.8 (0%) | 3.4 (−50%) | 1.4 (−79%) |
| Vigour | 13.2 (0%) | 14.6 (+11%) | 15 (+14%) |
| TMD | 9.8 (0%) | 0.6 (−94%) | −6.6 (−167%) |

It can be seen that advantage results were observed in the tension, anger, confusion, vigor, and overall TMD results at Day 1 and Day 3 post dosing time points. In all these domains, the trend continued to improve from the results observed at Day 1 to Day 3. Interestingly, we observed no felt effect in the Depression domain. Additionally, we observed an increased fatigue at the post-dosing at Day 1, which then returned to baseline at Day 3. However, some caution needs to be taken with this finding, as one of the five subjects had strong fatigue scores at the Day 1 post drink mark. That said, even when eliminating that subject's score, fatigue in this group was raised at Day 1 Post drink compared to the other test Dosage groups.

Dosage Group B

Table 2 below shows the average scores for each domain from the five test subjects, both in terms of real values, as well as relative to baseline at 0% shown in brackets (pre-drink values on day 1). The comparative results are also seen in FIGS. 2-8.

TABLE 2

Results from Dosage Group B

| Domain | Pre-test, Day 1 Real value (relative to Baseline) | Post-dose, Day 1 Real value (relative to Baseline) | Post-dose, Day 3 Real value (relative to Baseline) |
| --- | --- | --- | --- |
| Tension | 9.6 (0%) | 3.6 (−63%) | 3.4 (−65%) |

TABLE 2-continued

Results from Dosage Group B

| Domain | Pre-test, Day 1 Real value (relative to Baseline) | Post-dose, Day 1 Real value (relative to Baseline) | Post-dose, Day 3 Real value (relative to Baseline) |
| --- | --- | --- | --- |
| Depression | 0.6 (0%) | 0.0 (0%) | 0.0 (0%) |
| Anger | 4.4 (0%) | 3.6 (−18%) | 2.2 (−50%) |
| Fatigue | 6.2 (0%) | 2.8 (−55%) | 2.2 (−65%) |
| Confusion | 3.2 (0%) | 1.0 (−69%) | 0.8 (−75%) |
| Vigour | 15.6 (0%) | 17.8 (+14%) | 20.2 (+29%) |
| TMD | 8.4 (0%) | −6.8 (−181%) | −22.6 (−238%) |

We observed advantageous results in the tension, anger, fatigue, confusion, vigor, and overall TMD results at Day 1 and Day 3 post dosing time points. In all these domains, the trend continued to improve from the results observed at Day 1 to Day 3, and the apparent effects were more pronounced compared to Dosing Group A. Interestingly, we still observed no felt effect in the Depression domain. Importantly, beneficial fatigue results were observed unlike the results seen in Dosing Group A at Day 1 Post dosing.

Dosage Group C

Table 3 below shows the average scores for each domain, both in terms of real values, as well as relative to baseline at 0% shown in brackets (pre-drink values on day 1). The results can also be seen in FIGS. 2-8. NB: Data for Dosage Group C is only from one subject thus far (further data from remaining four subject to be provided in due course, once received).

TABLE 3

Results from Dosage Group C

| Domain | Pre-test, Day 1 Real value (relative to Baseline) | Post-dose, Day 1 Real value (relative to Baseline) | Post-dose, Day 3 Real value (relative to Baseline) |
| --- | --- | --- | --- |
| Tension | 8.0 (0%) | 5.0 (−38%) | 3.0 (−63%) |
| Depression | 0.0 (0%) | 0.0 (0%) | 0.0 (0%) |
| Anger | 0.0 (0%) | 0.0 (0%) | 0.0 (0%) |
| Fatigue | 4.0 (0%) | 1.0 (−75%) | 2.0 (−50%) |
| Confusion | 2.0 (0%) | 1.0 (−50%) | 1.0 (−50%) |
| Vigour | 8.0 (0%) | 9.0 (+13%) | 9.0 (+13%) |
| TMD | 6.0 (0%) | −2.0 (−133%) | −3.0 (−150%) |

Although we only have data points from one subject currently in Dosing Group C, we believe the data are likely to be reliable as an early indication. The remaining data from the other four subjects will be added in due course once received.

We observed reduction in advantageous results in the tension, fatigue, confusion, vigor, and overall TMD results at Day 1 and Day 3 post dosing time points; however generally not as pronounced as the other Dosing Groups, as also reflected in the TMD scores. Additionally, although Fatigue domain scores dropped significantly at Day 1 post drink, the scores rose again at Day 3 post drink, albeit not to baseline.

We saw no changes in the Depression domain, identical to Dosing Groups A and B.

Additionally, we saw no changes in the Anger domain.

Dosage Group D

Table 4 below shows the average scores for each domain from the five test subjects, both in terms of real values, as well as relative to baseline at 0% shown in brackets (pre-drink values on day 1). The comparative results are also seen in FIGS. 2-8.

TABLE 4

Results from Dosage Group D

| Domain | Pre-test, Day 1 Real value (relative to Baseline) | Post-dose, Day 1 Real value (relative to Baseline) | Post-dose, Day 3 Real value (relative to Baseline) |
| --- | --- | --- | --- |
| Tension | 7.4 (0%) | 3.6 (−51%) | 2.6 (−65%) |
| Depression | 0.8 (0%) | 0.0 (−100%) | 0.6 (−25%) |
| Anger | 1.2 (0%) | 0.0 (−100%) | 0.4 (−67%) |
| Fatigue | 6.8 (0%) | 3.4 (−50%) | 1.8 (−74%) |
| Confusion | 3.4 (0%) | 1.8 (−47%) | 0.8 (−76%) |
| Vigour | 12.8 (0%) | 13.8 (+16%) | 14.8 (+16%) |
| TMD | 6.8 (0%) | −5.0 (−174%) | −8.6 (−226%) |

Like Dosing Group B, in Dosing Group D we observed advantageous results in the tension, anger, fatigue, confusion, vigor, and overall TMD results at Day 1 and Day 3 post dosing time points. In all these domains, the trend continued to improve from the results observed at Day 1 to Day 3, apart from Depression domain, which showed slight transgression to baseline at Day 3 but still an improvement from said baseline. Advantageously, we also observed a considerable felt effect in the Depression domain, which was unseen in both Dosing Groups A and B. Additionally, unlike Dosing Group A, there is no increase in fatigue at Day 1 Post dosing.

Discussion

Each of Dosing Groups A, B, C and D had advantageous therapeutic results and all were therefore considered commercially relevant, yet results showed that overall Dosing Groups B and D were the most effective.

First, when we compared to the results obtained with our previous cross-over trial (see FIG. 1), we were surprisingly able to achieve similar, if not better, post-drink mental clarity results, with just selecting two of the three components previously seen as critical to the formulation's success. A clear point of difference was that we were able to achieve the mental clarity results with no catechins (e.g. EGCG) being required, which was seen as an important component leading to the mental clarity results previously seen. Furthermore, our previous cross-over study did not assess the impact of the berryfruit, so it was unclear what advantages or disadvantages this might pose with its inclusion as one of the three possible components.

Looking broadly at the cross-over trial results, we consider the Depression, Vigour and Confusion domain results are roughly the same to our current results seen at day 1 post drink stage. However, we think there appears to be an improvement in the Tension and Fatigue domains in the compositions according the present invention compared to the results of the cross-over trial. Additionally, we were able to show advantageous results in the Anger domain, which was not tested in the cross-over trial. Moreso, a key advantage we see is that the mental clarity effects are continuing to improve to Day 3 results in the present study, whereas this was untested in the previous cross-over trial.

We turn now to a discussion and comparison of the four compositions/Dosing Groups A-D tested in the current study. When assessing just the dual combinations first, i.e. Dosing Groups A-C, the combination of pine bark extract and berryfruit extract (Dosing Group B) demonstrates the most beneficial mental clarity effects according to the POMS test results. Such an outstanding mental clarity outcome was not observed when either the pine bark extract or berryfruit extract was combined with just L-theanine (A and C, respectively), as can be seen most clearly in the TMD graph at FIG. 8. Therefore we consider there was a synergistic effect between the pine bark extract and berryfruit extract, especially at the dosage levels/ratios of the components tested. Even more exciting, this overall synergy (as exemplified by TMD) was not affected with the inclusion of L-theanine (as per Dosage Group D), and in fact, a further improvement was seen in both the Depression and Anger domains.

However, Dosing Groups A and C both demonstrate beneficial effects, and therefore we still consider these to be commercially and therapeutically attractive embodiments of the present invention.

However, when considering overall results, ideally one achieves favourable results across most if not all domains, and this was most apparent in the Dosing Group B and even moreso with Dosing Group D (both with the pine bark extract and berryfruit extract).

Therefore, we may conclude that, looking holistically, the composition and dosage used for Dosage Group D overall shows the most favourable results across the different domains in the four different trials, followed closely by Dosage Group B.

These unexpected attributes were seen to be a major commercially important outcome, and a significant step forward from our initial work, not only from a therapeutic level, but also from a formulation complexity and ease/cost of manufacturing perspective.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

What I claim is:

1. A composition comprising a pill or capsule dosage form in a combination of:
    a) at least 50 mg of a synthetically derived L-theanine; and
    b) at least 300 mg of a blackcurrant extract that contains anthocyanin(s), wherein the composition excludes additionally added catechin(s) and wherein the composition is used to reduce fatigue following one hour after consumption of the pill or capsule dosage composition.

2. The composition according to claim 1 wherein the composition comprises a dosage of:
    a. 300-1000 mg blackcurrant extract containing anthocyanins; or b. 400-700 mg blackcurrant extract containing anthocyanins; or c. about 500 mg blackcurrant extract containing anthocyanins.

3. The composition according to claim 1 wherein the composition comprises a dosage of:

a. between 100-500 mg L-theanine; or b. between 100-300 mg L-theanine; or c. about 200 mg L-theanine.

4. The composition according to claim 1 where the composition, or a product to which the composition is applied, is caffeine free.

5. A composition as claimed in claim 1 wherein the composition further comprises at least one additional component selected from the group consisting of a micronutrient, a macronutrient, a vitamin, a mineral, a bioactive, an extract, a fortificant and combinations thereof.

\* \* \* \* \*